United States Patent
Collet (10) Patent No.: US 10,280,851 B2
(45) Date of Patent: May 7, 2019

(54) METHOD AND DEVICE FOR DETERMINING A MODEL OF FLOWRATE THROUGH A VALVE

(71) Applicants: CONTINENTAL AUTOMOTIVE FRANCE, Toulouse (FR); CONTINENTAL AUTOMOTIVE GMBH, Hannover (DE)

(72) Inventor: Thierry Collet, Fontenilles (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/741,821

(22) PCT Filed: Jul. 8, 2016

(86) PCT No.: PCT/EP2016/001176
§ 371 (c)(1),
(2) Date: Jan. 4, 2018

(87) PCT Pub. No.: WO2017/005369
PCT Pub. Date: Jan. 12, 2017

(65) Prior Publication Data
US 2018/0195444 A1 Jul. 12, 2018

(30) Foreign Application Priority Data
Jul. 9, 2015 (FR) ...................................... 15 56525

(51) Int. Cl.
*F02D 11/10* (2006.01)
*F02D 41/14* (2006.01)
(Continued)

(52) U.S. Cl.
CPC ........... *F02D 41/004* (2013.01); *F02D 41/00* (2013.01); *F02D 41/0045* (2013.01);
(Continued)

(58) Field of Classification Search
CPC .... F02D 41/004; F02D 41/0045; F02D 41/00; F02D 41/0042; F02D 41/0032;
(Continued)

(56) References Cited

U.S. PATENT DOCUMENTS

| 5,050,568 A | 9/1991 | Cook |
| 5,199,404 A | 4/1993 | Cook et al. |

(Continued)

FOREIGN PATENT DOCUMENTS

| CA | 2071925 A1 | 6/1991 |
| CA | 2 450 998 A1 | 9/2004 |

(Continued)

OTHER PUBLICATIONS

International Search Report, dated Oct. 31, 2016, from corresponding PCT application No. PCT/EP2016/001176.

*Primary Examiner* — Hai H Huynh
(74) *Attorney, Agent, or Firm* — Young & Thompson (57) ABSTRACT

Disclosed are a method and device for determining a model of flowrate for a valve, including: instantiation of the model initially equal to an approximate model; choosing flowrate setting; determination of an initial command corresponding to the flowrate setting by the model; application of the initial command to the valve; observation of a discrepancy indicative of a difference between the flowrate setting and a flowrate achieved; if the discrepancy is not zero, application of a correction to the initial command, and return to the application step; if the discrepancy is zero, correction of the model by replacing, for the flowrate setting, the initial command by the corrected command, where the flowrate (Continued)

passing through the valve ends up in a combustion engine admission collector including a small-area controller regulating the flowrate of air admitted, and where the discrepancy of the observation step is the deviation of the small-area controller.

20 Claims, 4 Drawing Sheets

(51) Int. Cl.
  *F02D 41/00* (2006.01)
  *G01F 25/00* (2006.01)
(52) U.S. Cl.
  CPC ...... *G01F 25/00* (2013.01); *F02D 2200/0402* (2013.01); *G01F 25/0007* (2013.01)
(58) Field of Classification Search
  CPC ..... F02D 2041/1433; F02D 2200/0402; G01F 25/00; G01F 25/0007
  USPC ............................. 123/520, 399; 73/114.39
  See application file for complete search history.

(56) References Cited

U.S. PATENT DOCUMENTS

| | | |
|---|---|---|
| 5,226,398 A | 7/1993 | Cook et al. |
| 5,448,981 A | 9/1995 | Cook et al. |
| 6,138,644 A | 10/2000 | Saruwatari et al. |
| 9,309,991 B2 * | 4/2016 | Shimane .............. G05D 7/0635 |
| 2009/0132147 A1 | 5/2009 | Jensen et al. |
| 2014/0116526 A1 | 5/2014 | Shimane |
| 2014/0129035 A1 | 5/2014 | Marquette et al. |

FOREIGN PATENT DOCUMENTS

| | | |
|---|---|---|
| DE | 198 56 842 A1 | 6/1999 |
| EP | 1 382 832 A2 | 1/2004 |
| EP | 1 396 773 A1 | 3/2004 |
| JP | H07-63080 A | 3/1995 |
| JP | H08-270476 A | 10/1996 |
| JP | 2003-065165 A | 3/2003 |
| JP | 2013-204575 A | 10/2013 |
| WO | 02/20962 A1 | 3/2002 |
| WO | 2013/103161 A1 | 7/2013 |

* cited by examiner

METHOD AND DEVICE FOR DETERMINING A MODEL OF FLOWRATE THROUGH A VALVE

BACKGROUND OF THE INVENTION

The present invention relates to a method for determining a model of flowrate through a valve.

A particular application relates to a valve delivering a flowrate toward an intake manifold of an internal combustion engine. Still more particularly, the invention may be applied to a canister purge valve.

Figure 1:
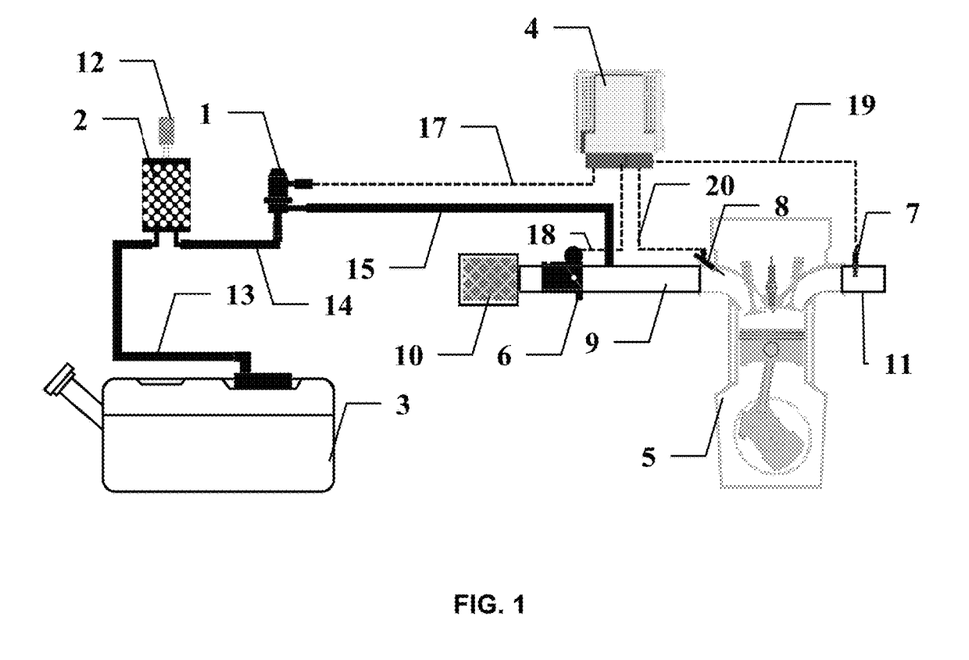
FIG. 1 shows a possible environment of the invention.

The context is that of the environment of an intake manifold as shown in the diagram of FIG. 1. This diagram depicts an internal combustion engine 5. This engine 5 comprises an intake manifold 9, for introducing air into the engine 5 to enable the combustion of a fuel to take place therein, and an exhaust 11 for discharging the combustion products.

The fuel is typically a liquid in the form of a volatile mixture of hydrocarbons, the vapors of which are polluting. To prevent pollution of the external environment, the fuel is stored in a liquid-tight and gas-tight tank 3. In order to accommodate the inevitable variations of pressure in the tank 3, the latter is connected, via a line 13, to a filter or canister 2 capable of capturing the vapors emitted from the fuel, while letting air escape via a kind of vent outlet 12, to allow the pressure to decrease. This canister 2 comprises a volume filled with an absorbent material such as activated carbon. The volume of this absorbent material gives the canister 2 a specific vapor capture and storage capacity. To regenerate this capacity, the canister 2 is advantageously purged, said vapors stored in the canister 2 being sent toward the engine 5 to be burnt there. This is done by means of a purge valve 1, connected to the canister 2 by a line 14 and to the intake manifold 9 by a line 15. When the purge valve 1 is open, suction of the vapors stored in the canister 2 is provided by a pressure drop created by the engine 5.

As shown in FIG. 1, an engine control unit 4 controls, in a conventional and known way, a reduced area controller 6 which regulates the flowrate of air admitted into the intake manifold 9 and consequently into the engine 5. The engine control unit 4 receives information from the richness sensor 7, and controls the purge valve 1, together with the injector(s) 8, to manage the purging of the canister 2 while maintaining a stoichiometric mixture in the cylinders.

A first problem is that of estimating the load, or utilization of capacity, of the canister 2, for the purpose of determining an optimal purge strategy based on the operating phases of the engine, on the one hand, and estimating the contribution of the canister 2 to the fuel supply to the engine 5 on the other hand, in order to reduce the contribution of the normal fuel supply circuit by the same amount, typically by means of one or more injectors 8.

The estimation of the load of the canister 2 is covered by another patent application filed by the present applicant. The principle is that of opening the purge valve 1 and observing the result of this opening on the deviation of a richness sensor 7 positioned in the exhaust 11. Said deviation is representative of an amount of fuel that has left the canister 2. The load of the canister 2 is estimated as a function of this amount related to the flowrate through the purge valve 1 during its opening.

Thus the estimation of the canister load requires precise modeling of the flowrate through the purge valve 1 as a function of the applied opening command. Other applications may require the knowledge of a flowrate model.

Figure 2:
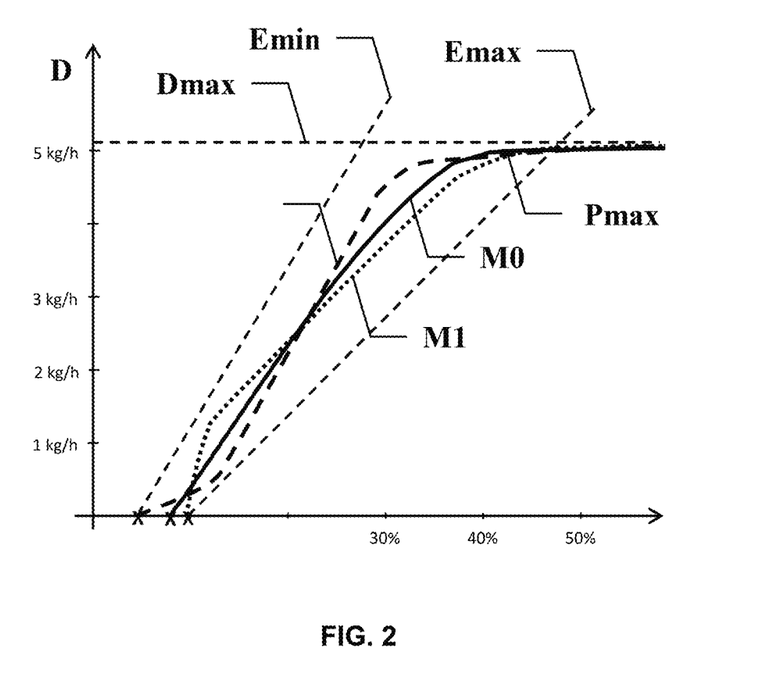
FIG. 2 shows the characteristic curve of a model in a flowrate/command diagram.

In order to be able to use a valve 1 appropriately, it is necessary to know the flowrate D through the valve 1 as a function of a command C applied to the valve 1. For this purpose, a model M may be used in order to relate a flowrate D to a command C applied to the valve 1. This model M may take different forms. It relates a flowrate value D to a command value C, or vice versa. It may be a function, $D=F_M(C)$ or $C=G_M(D)$, or alternatively a table of points (C, D). Such a model, generically denoted M, has a characteristic curve, of which three examples M0, M1, M2 are shown in FIG. 2, according to a diagram representing the command C on the horizontal axis and the flowrate D on the vertical axis. This characteristic curve M, M0, M1, M2 typically comprises three parts, namely a first, substantially horizontal, part between the origin 0 and an opening point P0, where, as long as the command C remains below a threshold value, the valve 1 remains closed and no flowrate is present (D=0); a second part, between the opening point P0 and a point Pmax, where the flowrate D varies between 0 and a flowrate substantially equal to a maximum flowrate Dmax of the valve 1, as the command C increases; and a third part, beyond the point Pmax, which is substantially horizontal, where the flowrate is substantially equal to the maximum flowrate Dmax, independently of the further increase in the command C.

One difficulty is that of estimating the position of the opening point P0, P0'. Another patent application filed by the present applicant proposes a solution to this problem. Reference may usefully be made to this. The opening point P0, P0' may also be determined by the identification of the valve 1 on a test bench. The opening point P0, P0' is assumed to be known in the remainder of the present description.

The characteristic curve M0, shown in solid lines, represents a "nominal" or average valve. However, it appears that valves used in practice may exhibit "deformed" characteristic curves, such as the characteristic curve M1, shown in the dotted line, or the characteristic curve M2, shown in the dashed line. Such variations may thus appear within the same series of valves, due to manufacturing variations (in terms of material, dimensions, supplier, etc.). These variations, relative to a "nominal" model, as illustrated by the characteristic curve M0, are so disturbing for the intended uses, such as canister load estimation, that they must be taken into account.

There is a known document US 2014/116526 which relates to an EGR valve controller. The method includes estimation of the flowrate through the valve, which is carried out with the use of a position sensor integrated with the EGR valve and an external measurement of the flowrate through this valve at the end of the production line in the manufacture of this valve. According to this document, a valve position sensor is necessary for the estimation of the flowrate.

The object of the invention is to determine a flowrate model M which associates a flowrate D with a command C for a valve 1.

SUMMARY OF THE INVENTION

The invention relates to a method for determining a model of flowrate which indicates a command to be applied to a valve to obtain a flowrate through the valve, comprising the following steps:

determining an approximate model, instantiating a working model that is initially equal to the approximate model, choosing a flowrate setpoint, determining an initial command corresponding to the flowrate setpoint by means of the working model, instantiating a working command, initially equal to the initial command, applying the working command to the valve, observing a divergence indicative of a difference between the flowrate setpoint and an actual flowrate, if the divergence is other than zero, applying a correction to the working command, and returning to the application step with a corrected working command, if the divergence is zero, correcting the working model by replacing the initial command with the working command for the flowrate setpoint, returning to the step of choosing a new flowrate setpoint, if necessary; otherwise the model is considered to be equal to the working model, where the flowrate through the valve reaches an internal combustion engine intake manifold comprising a reduced area controller regulating the admitted air flowrate, and where the divergence in the observation step is the deviation of the reduced area controller.

Thus the invention advantageously makes use of deviation information obtained from the pre-existing reduced area controller which regulates the air flowrate admitted into the intake manifold and therefore into the engine, instead of adding a supplementary sensor. The invention may be applied to a valve used for purging a canister. It should be borne in mind that a reduced area controller, based on a Saint-Venant model, controls, by a feedback procedure, the position of a butterfly valve positioned in the intake manifold of the engine in order to modify the passage cross section area in the air path between an inlet and the engine.

According to another characteristic, the flowrate setpoint is supplied to the reduced area controller and the reduced area controller incorporates it into its correction.

According to another characteristic, the valve is a canister purge valve.

According to another characteristic, the determination of an approximate model is carried out by identifying a valve on a measurement test bench.

According to another characteristic, the model is bounded by a minimum envelope and a maximum envelope.

According to another characteristic, the opening point is fixed.

According to another characteristic, the model is assumed to be linear, and the step of choosing a flowrate setpoint is executed only once, the model being corrected at a single point only, preferably remote from the origin.

According to another characteristic, the model is not assumed to be linear, and the step of choosing a flowrate setpoint is executed n times, the model being corrected at n points, where n is preferably between 2 and 10.

According to another characteristic, the model is interpolated between the points.

According to another characteristic, the direction of the correction is opposite that of the divergence.

According to another characteristic, the correction is constant.

According to another characteristic, the correction is proportional to the divergence.

The invention also relates to a device capable of determining a flowrate model, comprising an engine control unit, characterized in that said engine control unit is equipped with means for executing a method according to the invention.

The invention also relates to a motor vehicle comprising such a device.

BRIEF DESCRIPTION OF THE DRAWINGS

Other characteristics, details and advantages of the invention will be more fully apparent from the following detailed description, provided for guidance only with reference to the drawings, in which.

DETAILED DESCRIPTION OF THE PREFERRED EMBODIMENTS

The invention relates to a method for determining a flowrate model M. Such a flowrate model M is designed to indicate a command C to be applied to a valve 1 to obtain a flowrate D through the valve 1. The model M may be used in both directions; either it supplies a flow rate D obtained for a given command C, or, inversely, it supplies the command C to be applied for a desired flowrate D.

Figure 6:
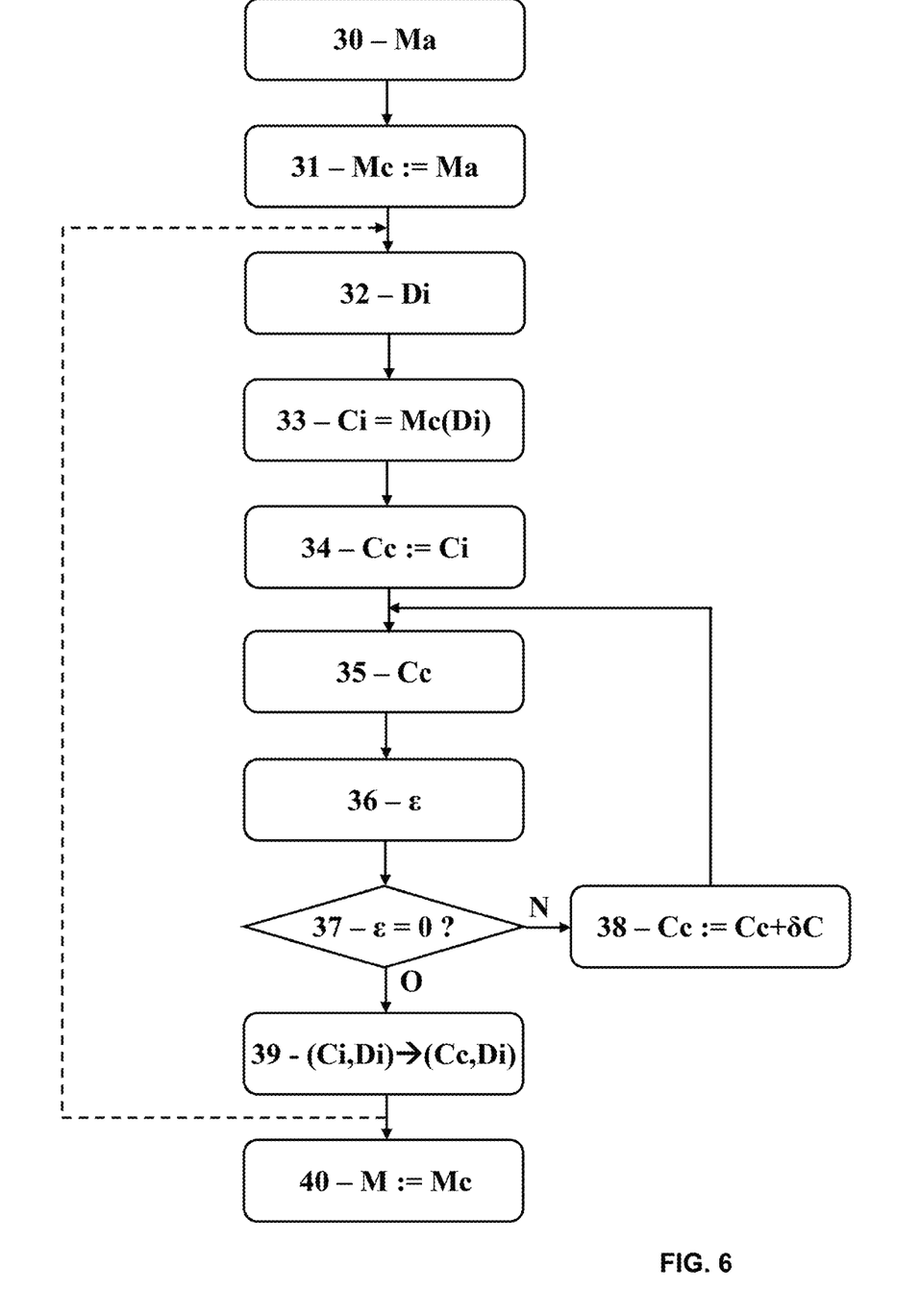
FIG. 6 shows a flow chart of the method.

The steps of the method for determining such a flowrate model M are shown in the flow chart of FIG. 6.

The proposed method proceeds by improvement, specifying one model per correction in a recursive way, around at least one operating point.

Thus a first step 30 is that of determining an approximate model Ma which will act as the starting point of the method for applying corrections. This step is typically executed in advance, once only. If necessary, it may be repeated for a new series of valves whose characteristics differ excessively. The determination of an approximate model Ma may be carried out by any method. Detailed examples are given below.

A model M, Ma, Mc may have different forms, depending on the intended applications. A model M may be represented by a characteristic curve in a flow rate/command space, by a function supplying a flow rate D as a function of a command variable C or by the inverse function supplying a command C as a function of a flow rate variable D. More conventionally, for practical use with computerized systems, a model M is represented by a table of operating points, each represented by a (flowrate, command) pair, the flowrate and the command being associated. The density of the operating points may have any value and is chosen on the basis of the resolution required for the application.

One of the objects of the invention is to correct, from one valve 1 to another, the variations of model M that appear because of manufacturing variations. Thus the method is mainly intended to determine the differences between a model M and a generic or average model. The approximate model Ma may also be such an average model.

The method operates by improving the model in an iterative way. It is therefore helpful to use a working model, or operating model Mc, which is progressively modified as the corrections take place. In a second step 31, this working model Mc is instantiated and is initialized to the value of the approximate model Ma.

The method operates by correcting the model M, Mc around a certain number of operating points P1, P2. An operating point P1, P2 is defined by a flowrate setpoint Di that is to be obtained, and by a command Ci associated with this flowrate Di. The method chooses a first point P1, P2, where a correction of the model is desired, by choosing a flowrate Di, in a third step 32. The point is completed, in a fourth step 33, by the determination of an initial command Ci. This command is described as initial because it is the command before correction. This initial command Ci is determined, by means of the working model Mc, as being the command corresponding to the flowrate setpoint Di.

For similar reasons to those mentioned above for the model, if the command needs to be corrected, a working command, or operating command, Cc is used. In a fifth step 34, this working command Cc is instantiated and is initialized to the value of the initial command Ci.

In a sixth step 35, which is an application step, the working command Cc is applied to the valve 1.

In a seventh step 36, which is an observation step, the result of said application, namely a divergence ε, is observed. This divergence ε is a measurement indicative of a difference between the flowrate setpoint Di and an actual flowrate Dr. Thus this divergence ε may be used, on the basis of its value, to correct the working command Cc, until a zero divergence ε is obtained.

This zero value of the divergence ε is tested in the eighth step 37, which is a test step.

As long as the divergence ε is not zero, the actual flowrate Dr is different from the flowrate setpoint Di. In this case, the test 37 branches to an eighth step 38. In this correction step 38, the working command Cc is corrected by a correction δC. This results in a new working command Cc, or corrected working command, equal to the former working command to which a correction δC is added: this may be written Cc:=Cc+δC. In this case, the sign ":=" is an assignment sign, the right-hand working command Cc is the former working command, and the left-hand working command Cc is the new corrected working command that replaces the former working command hereafter.

After this correction 38, the method continues by returning to the application step 35, using the new corrected working command as the working command Cc. The method then reiterates steps 35-37. The loop comprising steps 35, 38 is executed until the working command Cc is such that the divergence ε is zero, indicating that the actual flowrate Dr is then equal to the flowrate setpoint Di.

If the divergence ε is zero in the test 37, the test 37 branches to a ninth step 39. In this step 39, the working model Mc is corrected. The operating point that initially associates the initial command Ci with the flowrate setpoint Di is replaced by a new corrected operating point, associating the last working command Cc, as obtained by the method, with the flowrate setpoint Di.

According to the embodiment, the method may apply a correction at one or more operating points P1, P2. If there are any remaining operating points P1, P2 to be processed, the method branches to step 32 to choose a flowrate setpoint Di, where one of the remaining operating points is considered. Conversely, if all the planned operating points P1, P2 have been processed, the method branches to a final step 40. After being finally corrected, the working model Cc is final model M to be supplied on exit from the method. Thus the final step comprises an assignment M:=Mc.

The basic principle of the method has been described. It may be used to determine a model M so that the latter is as representative as possible of the valve 1.

This principle is advantageous in that it may be implemented in situ, with the final valve 1 positioned in its operating environment. Such an in situ implementation enables the determination of the model M to include all the possible effects of the environment of the valve 1 (the canister 2, the lines 14, 15, the intake manifold 9, the pressure drops, etc.). Also advantageously, this makes it possible to repeat the method for the purpose of correcting the model M, at any step in the life of the valve 1, to allow for any changes over time, such as wear or ageing.

A divergence ε is used, this being indicative of a difference between the flowrate setpoint Di and the actual flowrate Dr, in the observation step 36. This divergence ε may be found according to different embodiments.

According to a first embodiment, a flowrate sensor is positioned in one of the lines 14, 15, 9, upstream or downstream of the purge valve 1. Such a flowrate sensor measures the actual flowrate Dr. A comparator to which the desired flowrate setpoint Di is supplied can then determine a divergence ε by calculating a difference Dr-Di. However, such a flowrate sensor is a costly component which it would be desirable to avoid.

According to another embodiment, a pressure sensor is positioned in one of the lines 14, 15, 9, near the purge valve 1. Such a pressure sensor may be used to estimate the actual flowrate Dr. A comparator may then determine a divergence ε, as before. Such a pressure sensor, although less costly than a flowrate sensor, is still a costly component which it would be desirable to avoid.

In a case of use, the flowrate D, Dr through the valve 1 reaches an intake manifold 9 of an internal combustion engine 5. In a conventional and known way, such an intake manifold 9 is equipped with a reduced area controller 6 which regulates the flowrate of air admitted into the intake manifold 9 and consequently into the engine 5. The reduced area controller 6, based on a Saint-Venant model, controls, by a feedback procedure, the position of a butterfly valve positioned in the intake manifold 9 in order to modify the passage cross section area in the air path between an inlet, represented by an air filter 10, and the engine 5. This control is provided, for example, by a PID feedback controller, on the basis of a flowrate setpoint $D_{CAR}$, mainly obtained from the driver command imparted by the accelerator pedal, by means of at least one flowrate and/or pressure sensor that can estimate the flowrate through it. Such a reduced area controller 6 is thus capable, for its feedback operation, of observing an error or deviation ε, if the flowrate through the butterfly valve, in the intake manifold 9, is different from the flowrate setpoint $D_{CAR}$. This deviation ε may be used as the divergence ε for the method as described above.

As long as the valve 1 remains closed, there is an actual flowrate $D_{EFF}$, substantially equal to the flowrate setpoint $D_{CAR}$, through the reduced area controller (6). In order to allow for the flowrate D, Dr supplied by the purge circuit 14, 15, 1 to the intake manifold 9, the flowrate setpoint $D_{CAR}$ of the reduced area controller 6 is corrected by adding the flowrate setpoint Di through the purge valve 1 to it. Thus, the reduced area controller 6 receives a corrected flowrate setpoint $D'_{CAR}$ equal to its former flowrate setpoint $D_{CAR}$ increased by the flowrate setpoint Di, $D_{CAR}$=$D_{CAR}$+Di. The reduced area controller 6 receives a setpoint $D'_{CAR}$=$D_{CAR}$+Di, and actually has a flowrate $D_{EFF}$+Dr through it. On the hypothesis that the flowrate setpoint $D_{CAR}$ remains constant throughout the method, and that the reduced area controller 6 is stabilized, the result is that the actual flowrate $D_{EFF}$ is substantially equal to the setpoint $D_{CAR}$. The through flowrate is thus substantially equal to $D_{CAR}$+Dr. Consequently, the sensor(s) associated with the reduced area controller 6 observe a deviation ε indicative of a difference between the actual flowrate Dr through the valve 1 and the flowrate setpoint Di of said valve 1. Thus the reduced area controller 6 incorporates the flowrate Di, Dr obtained from the valve 1 in the correction provided by its feedback control.

This characteristic is advantageous in that, for an advisable re-use of the pre-existing reduced area controller 6, it is possible to estimate the actual flowrate Dr through the valve 1, without adding a supplementary sensor.

If the reduced area controller 6 comprises a PID feedback controller, the divergence ε may comprise the integral component, I, of the PID controller.

The determination of a flowrate model for a valve 1 flowing into an intake manifold 9 may have a number of applications. According to a first application, the valve 1 is a canister purge valve (known in English as a canister purge solenoid, CPS). According to another application, the valve 1 is an exhaust gas recirculation (abbreviated in English to EGR) valve. According to yet another application, the valve 1 is a valve for recovering gases from the engine crankcase (known in English as positive crankcase ventilation, PCV).

The method advantageously starts with a first model or approximate model Ma. Such an approximate model Ma may be obtained by any method.

A first method uses a theoretical approach to construct an approximate model Ma. Modeling, by finite elements for example, may be used to construct a theoretical model.

Adopting a hypothesis of linearity, the model may be simplified into a characteristic in three segments, namely a first horizontal segment [0, P0], a second oblique segment [P0, Pmax] and a third horizontal segment [Pmax, +∞[. The definition of the two points, the opening point P0 and the point Pmax, is then sufficient for the construction of an approximate model Ma.

A second method consists in finding a model for a valve 1, by characterization on a measurement test bench. This model is precise for the characterized valve and forms an approximate model Ma for the other valves which differ from the characterized valve owing to manufacturing variations. Here again, it is possible to carry out full characterization over the whole operating range of the valve, with the desired resolution. Alternatively, it is possible to adopt simplifying hypotheses in order to characterize the valve around only a reduced number of points. The previous simplification in three segments is entirely determined by two points, namely the opening point P0 and another point, such as the point Pmax. Thus a characterization based on two points, or even a single point, the opening point P0 being known, may be used to deduce an approximate model Ma.

It should be noted here that, since the method corrects the model on the basis of the approximate model Ma, this approximate model Ma does not have to be very precise. This approximate model Ma is used as a starting point, around which the method constructs a precise model M.

Figure 3:
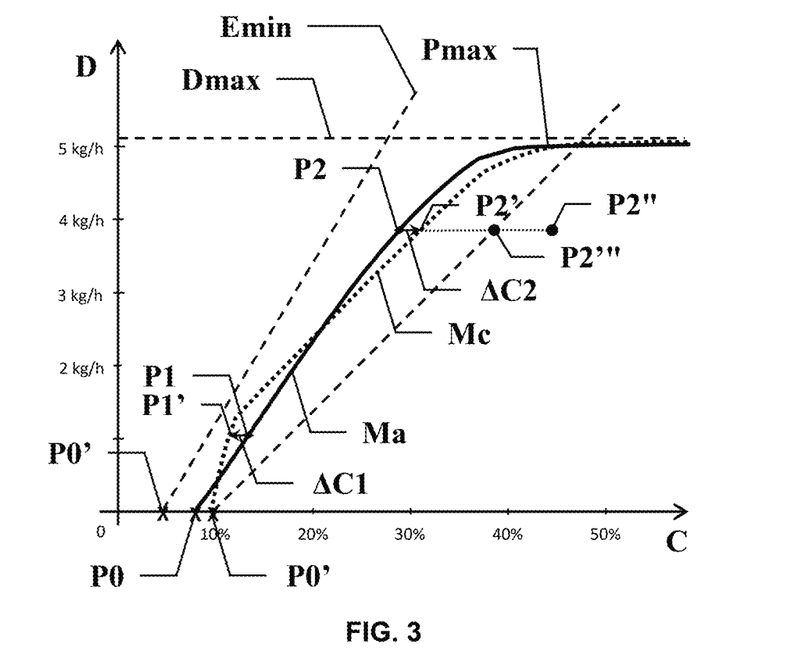
FIG. 3 shows the correction of a model in a flowrate/command diagram.
Figure 4:
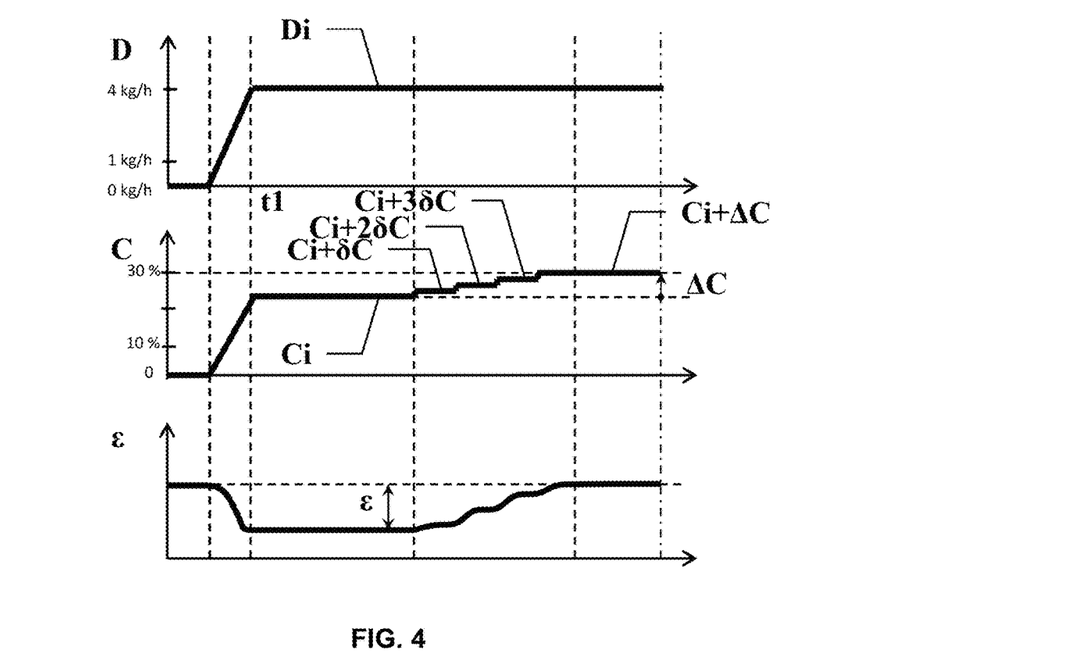
FIG. 4 shows, by means of three time curves, the correction of a command at a flowrate setpoint Di for a negative deviation.
Figure 5:
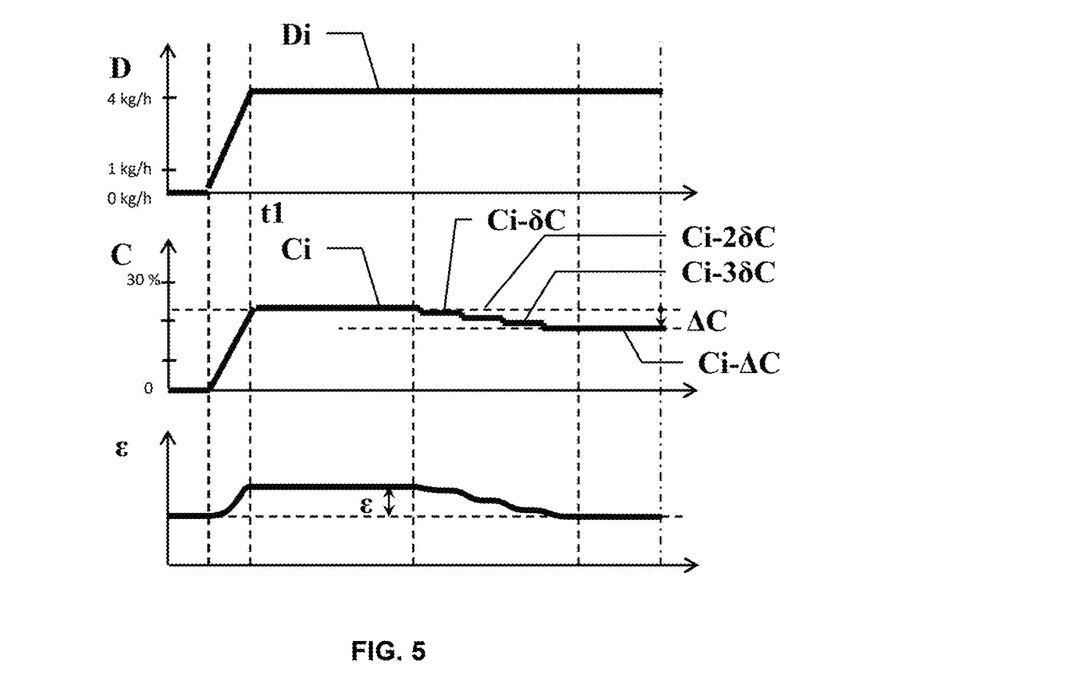
FIG. 5 shows, by means of three time curves, the correction of a command at a flowrate setpoint Di for a positive deviation.

With reference to FIGS. 3, 4, 5, certain steps of the method will now be described in greater detail. As shown in FIG. 3, the method makes use of an approximate model Ma, determined in step 30. A working model Mc is instantiated and is initialized to the value of the approximate model Ma, in step 31.

The method considers a first operating point P1. This point defines, for step 32, a flowrate Di, substantially equal to 1 kg/h, which is associated, via the working model Mc, with an initial command Ci, substantially equal to 13%.

For the purposes of FIGS. 2 and 3, it is assumed that the valve 1 is commanded by a PWM signal. Thus a command C is defined by a duty cycle as a percentage.

Step 33 determines this initial command Ci, and instantiates a working command Cc, and initializes it to the value Ci, in step 34.

The working command Cc, still equal to the initial command Ci, is applied to the valve 1. This is illustrated in FIG. 5, where three quantities are shown on curves as a function of time. From top to bottom, the first curve represents the flowrate D and takes the flowrate setpoint Di as its value. The second curve represents the command C. Starting at t1, in order to produce the flowrate setpoint Di, the working command Cc, still identical to the initial command Ci, as indicated Ci=Mc (Di) for the flowrate Di by the working model Mc, still identical to the approximate model Ma, is applied. This results in a deviation ε, visible on the third curve of the divergence ε.

It should be noted here that it is the deviation that is being considered. The measured value may be any value. The important factor is the differential value. Thus an origin value may be recorded before the application of the command Ci/Cc. It is this origin value, represented by a horizontal dotted line, that should be reproduced at the end of the correction, to ensure that the divergence ε measured relative to this origin value is zero.

Here, FIG. 5 shows a deviation ε that is positive, and therefore non-zero for the test 37, indicating a flowrate that is too high. Thus the command C should be reduced. Consequently a correction δC is removed in step 38, the working command Cc being replaced by its value minus this correction: Cc:=Cc−δC=Ci−δC. The method branches in step 35 and applies this new reduced working command. This has the effect of reducing the divergence ε. However, the curve ε has not yet reached its origin value and the divergence ε is not zero. Therefore a new correction δC is applied to the working command Cc, and Cc:=Cc−δC=Ci−2 δC. The method branches in step 35 and applies this new reduced working command. This has the effect of reducing the divergence ε further, but without cancelling it. The method loops back in this way for a number of iterations required to obtain a zero divergence ε; that is to say, four times in the example of FIG. 5.

At the end, when the divergence ε is zero, a total correction ΔC, ΔC1 equal to the cumulated successive elementary corrections δC has been applied to the initial command Ci. This corrected command value must be the new command value contained in the model, associated with the flowrate setpoint Di, and is contained in the working command variable Cc. Thus in FIG. 3 the point P1 is displaced horizontally from the correction ΔC, ΔC1, in this case toward the left, to the point P1'. The flow rate Di remains identical. The point P1, with coordinates (Ci, Di), is replaced by a new point P1', with coordinates (Ci−ΔC1, Di).

The method continues and produces a new correction for a second point P2. This point defines, for step 32, a flowrate Di, substantially equal to 4 kg/h, which is associated, via the working model Mc, with an initial command Ci, substantially equal to 28%.

The working command Cc, still equal to the initial command Ci, is applied to the valve 1. This is illustrated in FIG. 4, where the same three quantities as in FIG. 5 are shown on curves as a function of time. Starting at t1, in order to produce the flowrate setpoint Di, the working command Cc, still identical to the initial command Ci, as indicated Ci=Mc (Di) for the flowrate Di by the working model Mc, still identical to the approximate model Ma, is applied. This results in a negative deviation ε, indicating a flowrate that is too low. The command C should therefore be increased. Consequently a correction δC is added in step 38, the working command Cc being replaced by its value increased by this correction: Cc:=Cc+δC=Ci+δC. The method branches in step 35 and applies this new increased working command. This has the effect of reducing the divergence ε, in absolute value. However, the curve ε has not yet reached its origin value and the divergence ε is not zero. Therefore a new correction δC is applied to the working command Cc, and Cc:=Cc+δC=Ci+2 δC. The method loops back in this way until the divergence ε is cancelled.

At the end, when the divergence ε is zero, a total correction ΔC, ΔC2 equal to the cumulated successive elementary corrections δC has been applied to the initial command Ci. This corrected command value must be the new command value contained in the model, associated with the flowrate setpoint Di, and is contained in the working command variable Cc. Thus in FIG. 3 the point P2 is displaced horizontally from the correction ΔC, ΔC2, in this case toward the right, to the point P2'. The flow rate Di remains identical. The point P2, with coordinates (Ci, Di), is replaced by a new point P2', with coordinates (Ci+ΔC2, Di).

The new model M, contained in the working model variable Mc, now defined by at least two points, begins to take shape.

At this stage it is possible to consider and use the model that has been thus corrected at two points, or, for greater precision, to continue the correction, using other operating points.

To avoid any drift, due to a an error in measurement and/or calculation for example, and to ensure that the method determines a usable flowrate model M, two envelopes may advantageously be used to frame the model M. As shown in FIGS. 2 and 3, a first, lower, envelope Emin and a second, upper, envelope Emax are advantageously used to provide boundaries for the model M determined by the method.

The two envelopes Emin, Emax may be used according to at least two embodiments, illustrated with reference to FIG. 3. It is assumed that the method, during the correction at the point P2, causes a corrected point P2" to be determined in step 39, beyond the envelope Emax. According to a first embodiment, the correction is simply rejected, and the point P2 remains unchanged. According to a second embodiment, corrected point of P2 is taken to be equal to the most extreme point possible, that is to say the point P2''', located at the intersection with the envelope Emax.

Thus the use of the envelopes Emin, Emax ensures that the characteristic curve of the model M determined by the method continues to be contained between the two envelope curves Emin, Emax.

The opening point P0, P0' is a special point. It is the command, or the point P0, P0', where the valve 1 starts to open. As mentioned above, the determination of this point requires a special process. Regardless of its method of determination, advantageously according to the method proposed by another patent application of the present applicant, no correction should be applied to it by the present method. Thus, according to one characteristic, the present method keeps the opening point fixed. Thus, for the model M, Mc shown in FIG. 3, the opening point is the point P0', and remains fixed.

A simplifying hypothesis is to assume that the model M, Mc to be found is linear and comprises three segments, namely a first horizontal segment [0, P0'] from the origin 0 to the opening point P0', a second oblique segment [P0', Pmax] from the opening point P0' to a point Pmax of maximum flowrate Dmax, and a third horizontal segment [Pmax, +∞[ from the point Pmax.

Such a model is entirely defined by two points. Assuming that the opening point P0' is known, it is then simply necessary to apply the method to a single correction point P1, P2. This unique point, since it determines the slope of the second segment, is advantageously taken to be remote from the opening point P0' and therefore remote from the origin 0.

Conversely, if the linearity hypothesis is not adopted, the correction is advantageously made for at least n points P1, P2, where n is at least equal to 2. The maximum number n of points is a compromise between the precision desired for the model M and the complexity of the calculation. Reiterating the correction beyond 10 points does not appear to improve the model M substantially.

To ensure that the model M, Mc thus determined by the method can be used, the model M, Mc should, if necessary, be defined for points that do not coincide with the points P1, P2 used to make the corrections. Thus the model Mc, M may advantageously be interpolated between the points. The points for which the model M, Mc is known are, on the one hand, the correction points P1, P2, and, on the other hand, the opening point P0, P0', if appropriate.

To return to step 38 for the correction of a working command Cc, there are a number of possible embodiments for determining a correction δC, ΔC.

According to a characteristic which remains constant, except as regards the sign conventions, a correction, whether elementary, δC, or total, ΔC, is advantageously made in the opposite direction to the divergence ε. Thus, as described above in relation to FIGS. 4 and 5, a positive correction δC, ΔC is applied for a negative divergence ε, as shown in FIG. 4, and a negative correction δC, ΔC is applied for a positive divergence ε, as shown in FIG. 5.

According to one embodiment, the correction δC is constant. In this case, the correction δC is a relatively small increment, and the correction step performs what may be a large number of iterations, in order to reach the total correction ΔC. In this case, the correction is typically obtained with a resolution equal to said increment δC.

According to another alternative or complementary embodiment, the correction δC is proportional to the divergence ε. In this case, depending on the coefficient of proportionality or gain, the correction δC may approach the total correction ΔC more rapidly. The correction may be made in a limited number of iterations, or even in a single iteration.

The method according to the invention may be applied once, in order to model the valve 1 actually installed, typically as it leaves the factory.

The method, being advantageously suitable for operation in situ, may also be applied a number of times during the life of the valve 1. It may also be applied regularly, for example once every p starts of the engine 5, in order to correct any drift of the valve 1 due to ageing and/or wear.

The invention claimed is:

1. A method for determining a model of flowrate indicating a command (C) to be applied to a valve (1) to obtain a flowrate (D) through the valve (1), comprising:
    determining (30) an approximate model (Ma);
    instantiating (31) a working model (Mc) that is initially equal to the approximate model (Ma);
    choosing (32) a flowrate setpoint (Di);

determining (33) an initial command (Ci) corresponding to the flowrate setpoint (Di) by means of the working model (Mc);

instantiating (34) a working command (Cc), initially equal to the initial command (Ci);

applying (35) the working command (Cc) to the valve (1);

observing (36) a divergence ($\varepsilon$) indicative of a difference between the flowrate setpoint (Di) and an actual flowrate (Dr);

if the divergence ($\varepsilon$) is other than zero,
applying (38) a correction ($\delta C$) to the working command (Cc), and
returning to the application step (35) with a corrected working command (Cc);

if the divergence ($\varepsilon$) is zero,
correcting (39) the working model (Mc) by replacing the initial command (Ci) with the working command (Cc) for the flowrate setpoint (Di),
returning to the step of choosing (32) a new flowrate setpoint, if necessary;

otherwise,
a determined model (M) of flowrate is considered to be equal to the working model (Mc),
wherein a flowrate (D) through the valve (1) reaches an intake manifold (9) of an internal combustion engine (5) that includes a reduced area controller (6) regulating the admitted air flowrate, and
wherein the divergence ($\varepsilon$) in the observation step (36) is the deviation ($\varepsilon$) of the reduced area controller (6).

2. The method as claimed in claim 1, wherein the flowrate setpoint (Di) is supplied to the reduced area controller (6), and the reduced area controller (6) incorporates the flowrate setpoint (Di) into the correction.

3. The method as claimed in claim 2, wherein the valve (1) is a canister purge valve.

4. The method as claimed in claim 2, wherein the determination (30) of an approximate model (Ma) is carried out by identifying a valve (1) on a measurement test bench.

5. The method as claimed in claim 2, wherein the model (M) is bounded by a minimum envelope (Emin) and a maximum envelope (Emax).

6. The method as claimed in claim 1, wherein the valve (1) is a canister purge valve.

7. The method as claimed in claim 6, wherein the determination (30) of an approximate model (Ma) is carried out by identifying a valve (1) on a measurement test bench.

8. The method as claimed in claim 1, wherein the determination (30) of an approximate model (Ma) is carried out by identifying a valve (1) on a measurement test bench.

9. The method as claimed in claim 1, wherein the model (M) is bounded by a minimum envelope (Emin) and a maximum envelope (Emax).

10. The method as claimed in claim 1, wherein the opening point (P0) is fixed.

11. The method as claimed in claim 10,
wherein the model (M) is assumed to be linear, and
wherein the step of choosing (32) a flowrate setpoint (Di) is executed only once, the model (Mc) being corrected at a single point (P1, P2) only.

12. The method as claimed in claim 11, wherein single point (P1, P2) is remote from the origin (0).

13. The method as claimed in claim 10,
wherein the model (M) is not assumed to be linear, and
wherein the step of choosing (32) a flowrate setpoint (Di) is executed n times, the model (Mc) being corrected at n points (P1, P2).

14. The method as claimed in claim 13, wherein n is between 2 and 10.

15. The method as claimed in claim 1, wherein the model (Mc, M) is interpolated between the points (P0, P1, P2).

16. The method as claimed in claim 1, wherein the correction ($\delta C$, $\Delta C$) is in the opposite direction to the divergence ($\varepsilon$).

17. The method as claimed in claim 1, wherein the correction ($\delta C$) is constant.

18. The method as claimed in claim 1, wherein the correction ($\delta C$) is proportional to the divergence ($\varepsilon$).

19. A device capable of determining a flowrate model (M), comprising an engine control unit (4), wherein said engine control unit is equipped with means for executing a method as claimed in claim 1.

20. A motor vehicle comprising a device as claimed in claim 19.

* * * * *